Figure 1:
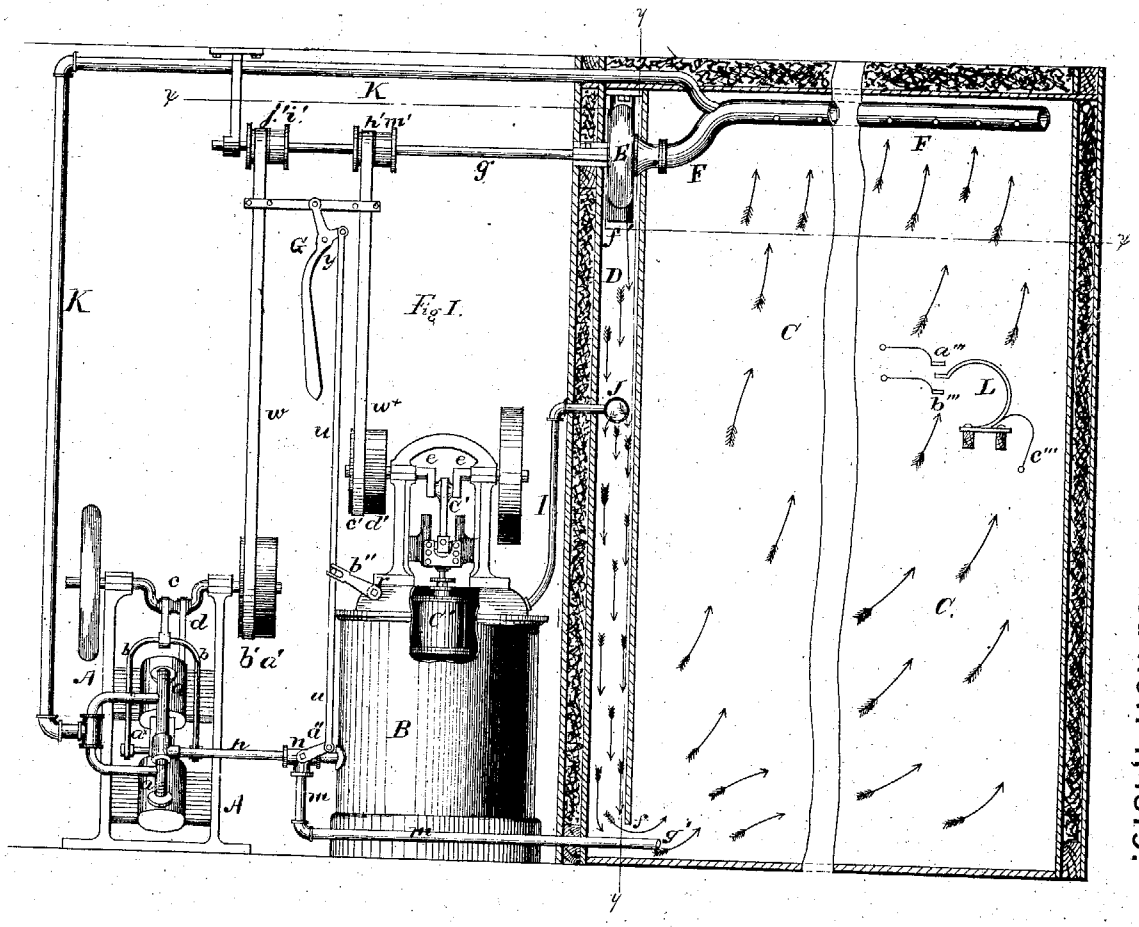

2 Sheets—Sheet 1.

J. A. WHITNEY.

Refrigerating Apparatus.

No. 8,955. Reissued Nov. 4, 1879.

Witnesses.
H. Wells, Jr.
Thos Farrell

Inventor.
James A Whitney

J. A. WHITNEY.

Refrigerating Apparatus.

No. 8,955. Reissued Nov. 4, 1879.

Attest:
F. J. Blanchard
W. A. Redmond

Inventor:
James A. Whitney

UNITED STATES PATENT OFFICE.

JAMES A. WHITNEY, OF NEW YORK, N. Y.

IMPROVEMENT IN REFRIGERATING APPARATUS.

Specification forming part of Letters Patent No. 210,979, dated December 17, 1878; Reissue No. 8,955, dated November 4, 1879; application filed September 16, 1879.

*To all whom it may concern:*

Be it known that I, JAMES A. WHITNEY, of the city, county, and State of New York, have invented certain Improvements in Refrigerating Apparatus, of which the following is a specification.

If atmospheric air or other elastic gas or gases be compressed and then allowed to expand, and, in expanding, be caused to perform work, or, in other words, be used as a means of force or energy, the air thus used will be reduced in temperature to an extent proportionate to the amount of work performed—that is to say, in proportion to the amount of force or energy expended.

The object of my invention is to provide an effective and comparatively simple means of utilizing this property of air and other elastic gases in the preservation of meats, vegetables, and other perishable articles of food, and for other purposes which may require a low temperature, or the employment of cooled or refrigerated air or gases; also, to insure the requisite dryness in the cooled air, and its transfer in determinate directions to those parts of the chill-room or structure to be cooled remote from the inlet at or through which the cooled air enters said room or structure.

My said invention comprises the combination, for joint operation, of an air-compressor, a means of cooling the air under compression, a closed chill-room, and a pipe in which is deposited, by condensation, the moisture of the air expanded after leaving the compressor, whereby, under any ordinary conditions of use, the requisite dryness of the cooled air is secured; also, the combination of an air-compressor, a means of cooling the air under compression, a closed structure or chill-room, and a fan or blower for accelerating and increasing the useful effects of the air cooled, as aforesaid.

My said invention further comprises the combination of a motor operated by compressed air, a fan or blower, and a pipe or passage extending from the exhaust of the said motor to the place or structure to be cooled, in such manner that the expanded air from the motor, reduced in temperature, because of the force or energy expended during its expansion, is mingled with the atmosphere of or within the said place or structure to be cooled; also, the combination of a fan or blower, an air-compressor, having its inlet port or passage in communication with the place or structure to be cooled, and a compressed-air motor for operating said fan or blower, and having its exhaust port or passage in communication with the said place or structure to be cooled, whereby the air to be compressed, used for operating the said motor, and reduced in temperature, is drawn repeatedly from and returned to said place or structure, in order that the refrigerating effect of the expanded air be, so far as practicable, retained in said place or structure; also, the combination of a device or appliance—as, for example, the exhaust pipe or passage of a compressed-air motor—for injecting a stream or jet or jets of cold air into the place or structure to be cooled, and a fan or blower for mingling the thus injected cold air with the volume of air of higher temperature contained in the said place or structure, in order that the refrigerating effect may be uniformly distributed throughout said volume of air, and in order that the excessive refrigeration of any one portion of said place or structure may be avoided; also, the combination of an air-compressor, an air-pipe leading thereto from the structure to be cooled, a compressed-air reservoir, and a compressed-air motor having its exhaust port or passage communicating with the structure to be cooled, whereby the most efficient co-operation of the compressor, motor, and fan, in cooling and circulating the air within the structure to be cooled, is secured; also, in the combination of an air-compressor, a compressed-air reservoir, a compressed-air motor having its exhaust port or passage communicating with the structure to be cooled, a system of connected cocks or valves, and an outlet-pipe extending from the pipe or passage which connects the air-compressor with the compressed-air reservoir, whereby provision is made for insuring the effective admixture of the cold air injected from the exhaust pipe or passage of the compressed-air motor with a current of air drawn from the place or structure to be cooled, and thus avoiding the direct introduction of the undiluted cold air into the said place or structure, and the local freezing effect that might be incident thereto; also, the combination of the hereinbefore-indicated outlet-pipe, a cock placed to operate in connection with the compressed-air reservoir, an air-compressor, a compressed-air reservoir, and a compressed-air motor, having its exhaust port or passage communicating with the structure to be cooled, whereby provision is made for directing the air from the air-compressor either into the compressed-air reservoir, in order that it may actuate the motor before being passed into the place or structure to be cooled, or, when the desired limit of reduction of temperature in said place or structure has been reached, direct from the compressor to the place or structure aforesaid; also, the combination of a shifting device with the hereinbefore indicated cock of the compressed-air reservoir, a cock provided to the inlet-port of the compressed-air motor, a fan or blower, and a belt or gearing for transmitting power from the said motor to the said fan or blower, whereby provision is made for insuring the operation of the fan or blower from a separate driving-pulley when the compressed-air motor is stopped, in order to prevent the temperature from falling lower than is desired in the place or structure to be cooled.

Figure 2:
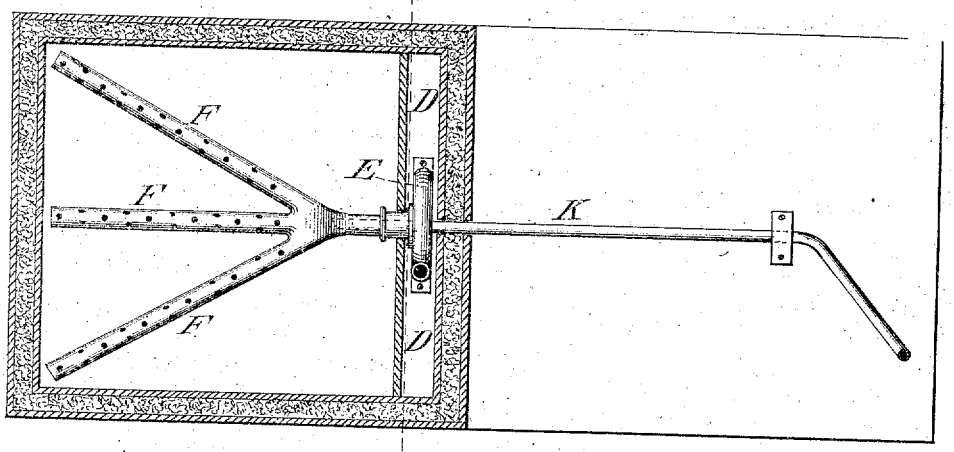
Figure 3:
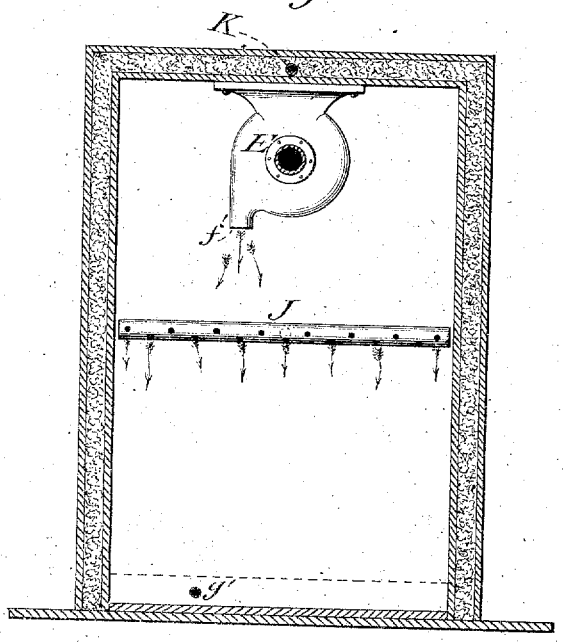

Figure 1 of the drawings is a side view and partial vertical sectional view of an apparatus embracing my said invention. Fig. 2 is a horizontal sectional view, as seen from below, taken in the line of *x x* of Fig. 1. Fig. 3 is a vertical transverse sectional view taken in the line *y y* of Fig. 1, and as seen from the right-hand end of Fig. 1.

A is an air-compressor. As shown in the drawings, it is constructed with two compressing-cylinders, the pistons of which are worked by a forked connecting-rod, *b*, extending from the piston-rod $a^x$ of the air-compressor to a driving-crank, *c*, which latter is rotated by the connecting-rod *d* of a suitable oscillating or other steam-engine. The said crank may, however, be driven by a pulley and belt from a separate and distinct motive power. The shaft on which said crank *c* is formed is provided with a fast pulley, *a'*, and a loose pulley, *b'*.

Any appropriate form or construction of air-compressor may be employed in lieu of that herein indicated, it being only requisite that the same be capable of compressing atmospheric air or other elastic gas into an appropriate receiver, and that it be of suitable shape and size, and, so far as practicable, of simple construction.

As air-compressors, considered by themselves, are well known, no further description of this element in my invention is considered necessary.

B is a strong vessel, into which the air is compressed by the air-compressor, and which constitutes the compressed-air reservoir, from which compressed air is supplied to actuate the compressed-air motor, (indicated at C'.) This motor is simply an engine operated by compressed air in lieu of steam, and, inasmuch as compressed-air engines, taken by themselves, are well known, no specific description thereof is here considered necessary.

In the drawings the compressed-air motor is represented as placed upon the compressed-air reservoir B, and in relation with the aeriform contents thereof, in substantially the same manner as steam-engines are frequently arranged in connection with upright steam-boilers; but, for the purposes of my invention, any other variety of engine adapted for the purpose, and any other arrangement of the engine with reference to the compressed-air reservoir, may be adopted, it being only required that the engine be capable of being operated by compressed air from said reservoir, that it be of suitable shape and size, and, so far as practicable, of simple construction. This compressed-air motor gives a rotary motion to a shaft, *e*, on which is a fast pulley, *c'*, and a loose pulley, *d'*.

C is the room or structure to be cooled. When intended for the preservation of meats or other perishable articles of food, the external atmosphere is practically excluded, and the ceiling, floor, and walls, so far as may be feasible, made non-conducting as concerns the transmission of heat.

At one end of the structure C is a vertical passage or narrow chamber, D, the lower end of which opens into the structure C, as shown at *f*, and in the upper part of which is a fan or blower, E, the driving-shaft of which is shown at *g*. The mouth or outlet *f'* of this fan or blower is downward, and to the central or inlet opening of said fan or blower is attached the extremity of a pipe or system of pipes, F, which may be perforated along their length, and which may extend along the ceiling of the structure C in any desired direction. The rotation in the requisite direction of the fan or blower causes the air contained within the structure C to pass into the pipe or pipes F, thence through the fan or blower, thence down through the passage D, and out therefrom, through the opening *f*, back into the structure C, whence it again passes to the pipe or pipes F, and so on in continuous circulation.

The air-compressor forces compressed air to the compressed-air reservoir through a pipe, *h*, connecting the outlet-passage of the said compressor with the said reservoir.

From the pipe *h* extends a branch pipe, *m*, the extremity of which opens into the structure C, as shown at *g'*. At the junction of the branch pipe *m* with the pipe *h* is a three-way cock, *n*, which, when turned in one position, closes the branch pipe *m* and opens communication between the air-compressor and the compressed-air reservoir, and when turned to another position closes communication between the compressor and the reservoir and opens the branch pipe *m*, so that air from the compressor may pass direct to the structure C.

At *r* is a cock, which opens and closes the inlet-passage of the compressed-air motor C'.

The cock $n$ has a crank-arm, $a''$, and the cock $r$ has a similar crank-arm, $b''$. These connect with a vertical rod, $u$, in such manner that the two cocks may be worked simultaneously and in unison by the longitudinal movement of the rod.

A belt, $w$, extends from the pulleys $a'$ $b'$ on the shaft of the crank $c$ of the air-compressor, to other pulleys, $i'$ $j'$, on the shaft $g$ of the fan or blower. Similarly a belt, $w^{\times}$, extends from the pulleys $c'$ $d'$ on the crank-shaft $e$ of the compressed-air motor to other pulleys, $h'$ $m'$, on the aforesaid shaft $g$ of the fan or blower.

The two belts are shifted simultaneously with reference to the fast and loose pulleys by means of a shipping-lever, G, in order, as occasion may require, to operate the fan or blower from the compressed-air motor or from the pulley $a'$ of the air-compressor.

The shipping-lever G has an arm, $y$, to which is attached the rod $u$, so that when the belt $w^{\times}$ is brought on the fast pulley $c'$ of the compressed-air motor the cock $r$ is operated to open the inlet-passage of the said motor, to permit the compressed air to pass thereto from the reservoir B to operate said motor, and simultaneously with this the cock $n$ is turned to permit a further supply of compressed air to be forced into said reservoir from the compressor. When, on the contrary, the belts are shifted to run the fan or blower from the pulley $a'$ of the compressor, the flow of compressed air from the reservoir to the motor is shut off by the cock $r$, and the flow of compressed air to the reservoir from the compressor is shut off by the cock $n$, the branch pipe $m$ being meanwhile opened by the cock $n$, to permit the air from the compressor to pass direct into the structure C.

A pipe or conduit, I, extends from the outlet or exhaust passage of the compressed-air motor C′ into the passage or chamber D, and connects in said passage or chamber with a cross-pipe, J, which is provided along its length with numerous holes or openings. A pipe or conduit, K, connects at one end with the pipe or system of pipes F and at the other with the inlet-passage of the air-compressor, so that the air drawn into the air-compressor and compressed thereby is drawn from the structure C—in other words, from the place to be cooled. Said air, being compressed into the reservoir B to the pressure requisite or desirable for the operation of the compressed-air motor, is then caused to pass to the said motor in substantially the same manner that steam is passed from the steam-boiler to a steam-engine, and, actuating the said motor, causes it to drive the fan or blower; and inasmuch as the force or energy consumed during the expansion of the air eliminates a proportionate quantity of heat from the air, it follows that the air expanded and exhausted from the motor after doing its work is very cold, and, passing into the pipe J, keeps the said pipe J at a low temperature. As the air aforesaid passes through this pipe J, the moisture contained in said air is condensed on the cold internal surface of the said pipe, and as fast as liquefied passes out through the orifices in the under side of said pipe, the air being, of course, dried, or diminished in dampness in proportion to the amount of moisture thus removed or abstracted from it by condensation. The cold air, thus dried, issues into the passage or chamber D, and is there mixed with the larger volume of air forced through said passage or chamber by the fan or blower, and, being thus dilated, is passed into the structure C, through the opening $f$, to cool the said structure without bringing the intensely cold air (issuing from the exhaust of the motor) into contact with the contents of the structure, and without causing the temperature to be materially or injuriously colder at one portion of the structure than at another.

In case the reduction of temperature within the structure C becomes so great as to render freezing imminent, the belts $w$ $w^{\times}$ (unless a freezing temperature is desired) are shifted to throw the work of running the fan or blower off from the compressed-air motor and upon the pulley $a'$ of the air-compressor, whereupon, the cocks $n$ and $r$ being actuated, as hereinbefore explained, to shut off the flow of compressed air from the compressor to the reservoir, and from the reservoir to the motor C′, the motor stops, and the compressor, so to speak, runs idle, and simply forces its air, without compression, into the structure C, while the fan or blower, being maintained in motion, continues to circulate the air contained within the said structure, but without the injection of the colder air.

When the tendency to excessive lowering of temperature has been arrested, or when the temperature has risen sufficiently to relieve from apprehension, the simple shifting of the belts again puts the parts in operation to run the fan or blower by means of the compressed-air motor, and to inject the cold exhaust-air from said motor into the passage or chamber D, as before.

When desired, the temperature within the structure C may be signaled to an attendant by a suitable thermostat operating in connection with suitable electric signals. For example, the bending or straightening of a curved compound metallic bar, L, by closing the circuits of suitable battery-wires $a'''$ $b'''$ $c'''$, may be made to actuate any appropriate electric-signal apparatus when either extreme of a given range of temperature is reached.

In order to deprive the compressed air of any excess of moisture not removed by the pipe J, any desired quantity of glycerine may be placed in the lower part of the compressed-air reservoir, suitable means being, of course, provided for drawing off and replacing the glycerine when it becomes too dilute.

When the invention is to be used for the preservation of meats or other perishable articles of food, carbonic acid, nitrogen, or other neutral or innoxious gas may be substituted for or instead of atmospheric air in the working or operation of the invention.

What I claim as my invention is—

1. The combination, for joint operation, of an air-compressor, a means of cooling the air under compression, a closed structure or chill-room, and a pipe for condensing the moisture from the cooled air, substantially as and for the purpose herein set forth.

2. The combination, for joint operation, of an air-compressor, a means of cooling the air under compression, a closed structure or chill-room, and a fan or blower, substantially as and for the purpose herein set forth.

3. The combination, for joint operation, of a compressed-air motor, a fan or blower, and a pipe or passage leading from the exhaust of said motor to the structure to be cooled, substantially as and for the purpose herein set forth.

4. The combination of a fan or blower, an air-compressor having its inlet port or passage communicating with the structure to be cooled, and a compressed-air motor for operating the fan or blower, and having its exhaust port or passage communicating with the structure to be cooled, substantially as and for the purposes herein set forth.

5. The combination of an apparatus for injecting a stream or jets of cooled air into the structure to be cooled, and a fan or blower for mingling said stream or jets of cooled air with the volume of air contained in said structure, substantially as and for the purpose herein set forth.

6. The combination of an air-compressor, an air-pipe leading thereto from the structure to be cooled, a compressed-air reservoir, and a compressed-air motor, having its exhaust port or passage communicating with the structure to be cooled, substantially as and for the purpose herein set forth.

7. The combination of an air-compressor, a compressed-air reservoir, a compressed-air motor, having its exhaust port or passage communicating with the structure to be cooled, a system of connected cocks or valves, *n r*, and an outlet-pipe, *m*, substantially as and for the purpose herein set forth.

8. The combination of a chamber or passage, D, with the exhaust pipe or passage of a compressed-air motor, and a fan or blower for circulating through said chamber or passage the volume of air within the structure to be cooled, substantially as and for the purpose herein set forth.

9. The combination of the outlet-pipe *m* and cock *n* with an air-compressor, a compressed-air reservoir, and a compressed-air motor, having its exhaust port or passage communicating with the structure to be cooled, substantially as and for the purpose set forth.

10. The combination of a shifting device with the cock *n* of the compressed-air reservoir, the cock *r* of the compressed-air motor, the fan or blower, and a belt or gearing for transmitting power from the said motor to the said fan or blower, substantially as and for the purpose set forth.

JAMES A. WHITNEY.

Witnesses:

H. WELLS, Jr.,

THOS. J. FARRELL.